Figure 1:
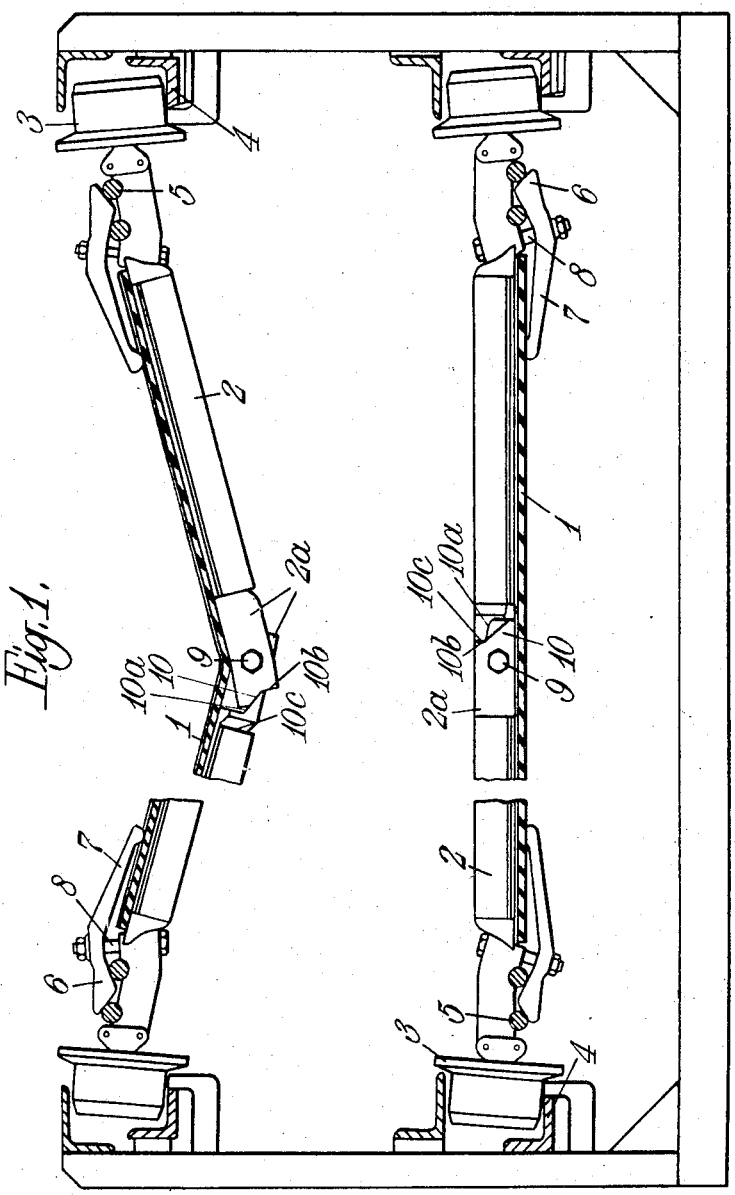

March 17, 1959 O. NOE 2,877,887
TROUGHED BELT CONVEYOR
Filed May 28, 1956 3 Sheets-Sheet 1

Inventor
O. Noe

March 17, 1959

O. NOE 2,877,887

TROUGHED BELT CONVEYOR

Filed May 28, 1956

3 Sheets-Sheet 2

Inventor
O. Noe

Inventor
O. Noe

United States Patent Office 2,877,887
Patented Mar. 17, 1959

2,877,887

TROUGHED BELT CONVEYOR

Oskar Noe, Duisburg, Germany

Application May 28, 1956, Serial No. 587,867

Claims priority, application Germany May 31, 1955

10 Claims. (Cl. 198—191)

The invention relates to a conveyor, more particularly for mine working. The novelty consists in that a conveyor belt is fixed at intervals of preferably 1–2 meters to cross bars, some at least of which are provided with lateral rollers, and is drawn by round-link chains, or similar traction means acting continuously on said bars, over rails and reversal stations along an upper run in one direction and along a lower run in the opposite direction. It is especially important that the transverse bars or roller shafts are provided with a swivel joint and the draw chains and rollers are situated substantially in the same plane as and laterally of the conveyor belt, so that in the upper run the said belt hangs in the manner of a trough but is tensioned at the reversal stations and in the lower run, on the same or approximately the same level as the draw chains and rollers.

According to the invention clamping devices are also used which secure both the conveyor belt and the chain to the cross bars. The clamping devices are constructed in the manner of two-armed levers, one arm of which fixes the conveyor belt and the other the chain, with interposition of a bolt or like clamping means. The lever arm securing the chain has oblique surfaces which engage into a horizontally disposed chain link, pressing the latter into recesses in the transverse bar. For this purpose, according to a further feature of the invention each transverse bar has bell-mouthed or trough-like cross-section which is open towards the conveyor belt and into which the conveyor belt side zones are pressed by the clamping arm.

In order to bring the trough-like upper run into a tensioned position at the reversal stations, it is further proposed to arrange in the middle of the conveyor belt, under the swivel joints, an endlessly circulating band which travels about one of the reversal wheels and about a wheel of smaller diameter situated at some distance from the reversal wheel.

According to a further feature of the invention, the shafts of the rollers are to be arranged on the transverse bars at an angle which amounts to 90° less half the inclination of the transverse bars when the conveyor belt hangs trough-like, so that the rollers are kept in the same inclined position in the trough-like upper run and in the tensioned lower run.

The construction according to the invention, is particularly suitable for a variable-length underground conveyor, having conveyor belt sections arranged one after the other to form the conveying surface. It is possible to make use of abandoned belts which can no longer be used for conventional belt conveyors wherein the belt is not relieved of pulling stresses. According to the invention these belt sections are laid one after the other before extension of the conveyor, overlapping to such an extent that they are always held jointly by two or more successive clamps. Then, when it is desired to lengthen the conveyor, the clamps are released and the belt sections drawn away from one another and again clamped together. This adjustment can be carried out until the belt sections overlap under only one common clamp and are held jointly thereby. Therefore, it is no longer necessary always to cut the individual belts to the exact lengths.

Various constructional examples of the invention are illustrated in the drawings.

Figure 2:
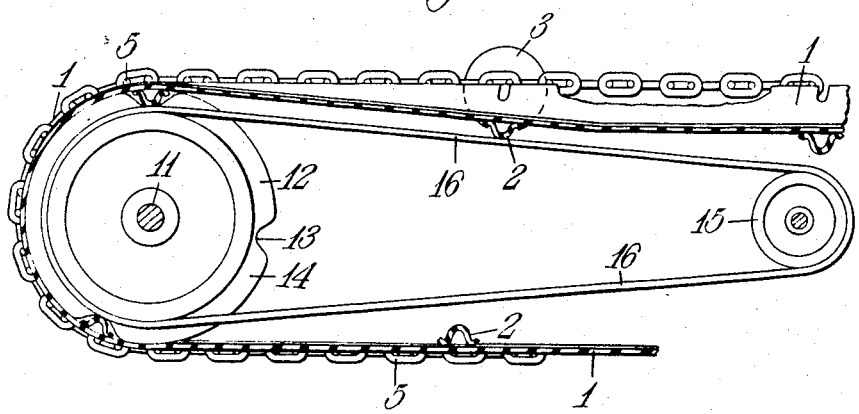
Figure 3:
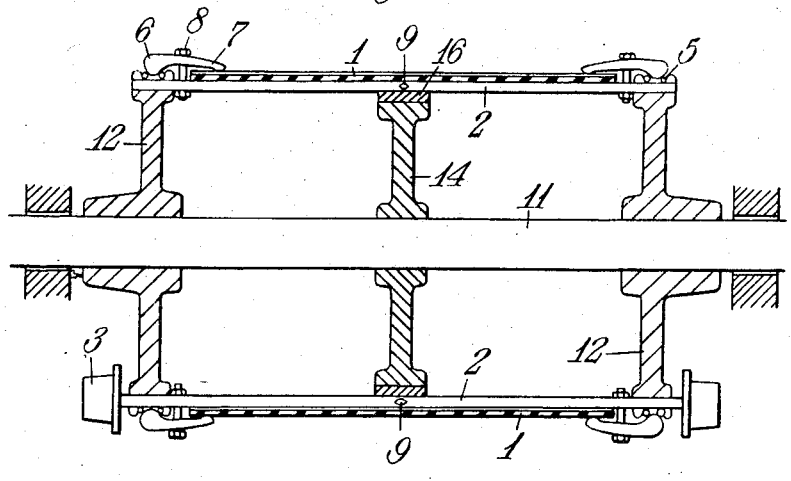
Figure 4:
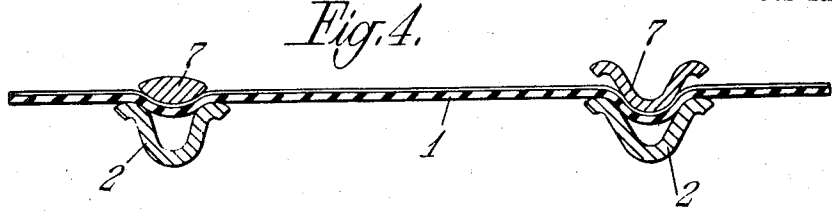
Figure 5:
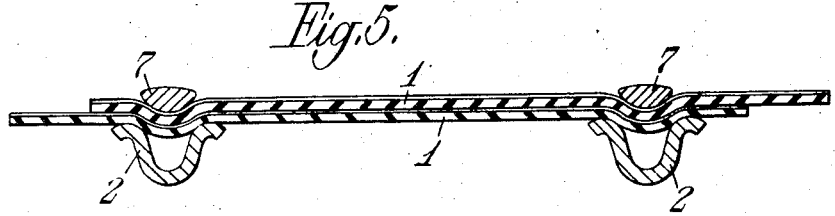
Figure 6:
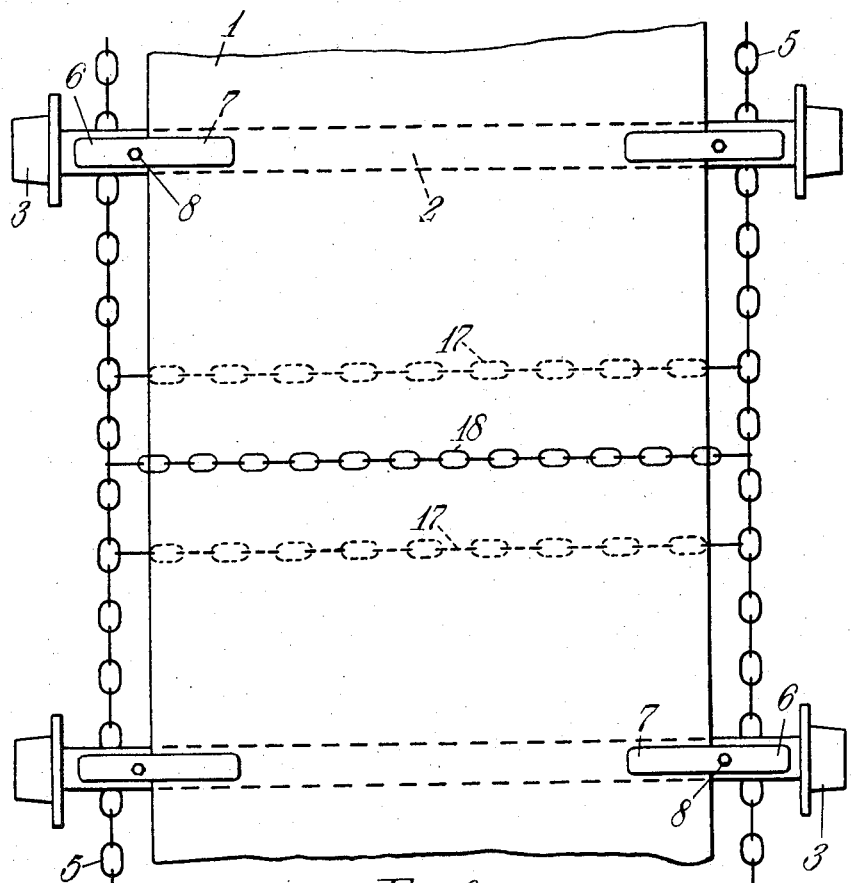

Figure 1 is a general cross-sectional view,
Figure 2 is a side view of a reversal station,
Figure 3 is a cross-section thereof,
Figures 4 and 5 show various possibilities of securing the belt or belt sections.
Figure 6 is a plan view of a special construction.

The conveyor belt or the individual belt sections are designated as 1; they bear against transverse bars 2, some of which also serve as support shafts for the rollers 3, which are pulled along the rails 4 by means of chains 5. The chains 5 are situated in the same plane or substantially the same plane as the belt 1.

6 and 7 designate two-armed levers for clamping, by means of a bolt 8 through each lever, both the belt 1 and the chain 5. Figures 4 and 5 show expedient constructions for the parts 2 and 7, for securely fastening the belt and preventing it from slipping.

As is illustrated in Fig. 1, each bar 2 consists of two portions. A part 2a is welded into each of these portions and the two portions are pivotally interconnected by a swivel pin 9 passing through the two parts 2a. The parts 2a are mutually complementary drop-forged parts each of which is the mirror image of the other. The parts 2a have mutually complementary abutment surfaces 10, 10a, 10b, 10c. In the sagging position in the upper run, as shown in the upper part of Fig. 1, the surfaces 10 and 10a of the parts 2a bear against one another, and in the straight position shown in the lower part of Fig. 1 the surfaces 10b and 10c of the parts 2a bear against one another. Thus in both positions the transverse carriers are self-supporting and require no separate supporting rollers at their center.

11 indicates the common shaft about which the belt 1 and the chains 5 travel along curved paths of equal or approximately equal radius at the reversal stations. In this way dragging strains on the belt are avoided. The reversal wheels for the chains 5 are given the reference numeral 12. They are formed with recesses 13 in order to permit of unhindered travel of the bars or shafts 2. The reversal wheels 12 are also provided with the usual means for engaging the chains 5, i. e. they are constructed as chain sprockets or chain wheels, so that they assume the function of driving wheels. These means are not shown in detail for the sake of simplicity.

14 designates a guide wheel and 15 another guide wheel about which is arranged a guide band 16 whose purpose is to bring the hanging upper run into the tensioned position in the region of the reversal station.

In the construction according to Figure 6, chains 17 are provided as supports for the belt in the upper run between the roller shafts 2, instead of limitedly hingeable transverse bars. A chain 18 situated at the other side of the belt ensures that the belt does not sag excessively in the lower run.

The conveyor according to the invention is characterized by its simple and advantageous construction. It is light and cheap. The chains and transverse bars and also the roller shafts remain continuously fixedly connected to the conveyor belt during operation. Nevertheless the belt is not subjected to dragging stress at the reversal points since at these points it is brought from the trough-like hanging state into the tensioned position, and belt and chains are situated in one plane. It is also important that it is readily possible to use belts which in themselves are relatively worth little, or abandoned belts or sections of belts which could no longer be used for conventional belt conveyors, since in this present case the belt is relieved of driving tension and need only be strong enough to take up the inherent tension between the roller shafts and transverse bars carrying it. The large quantities of conveyor belts which are laid aside and lie about unused in many mines can be put to good use again in a conveyor according to the invention.

It is also particularly simple to vary the length of the conveyor. To this end the belt sections are laid so as to overlap one another, before lengthening to such an extent that they are held jointly by two or more successive clamps, as illustrated in Figure 5. In order to lengthen the conveyor, the clamps are released and the belt sections merely drawn away from one another. This can be repeated until the overlapping belt sections only just lie in the region of one common clamp and can be secured jointly thereby. The draw chains can be extended in the usual way by using chain link closure members which are not shown in detail since they are known per se. Then of course further transverse bars and roller shafts can be added according to the amount of extension, so that the usual roller spacing can be substantially maintained. Vice versa, of course, it is also readily possible to shorten the conveyor in a similarly simple way, by taking out chain pieces with transverse bars and rollers, and increasing the amounts by which the belt sections overlap one another.

The conveyor can be lengthened or shortened quickly and without difficulty, since only a single common bolt or like means is required for belt and chain at each clamping point.

What is claimed is:

1. A variable-length conveyor which comprises an endless belt, transverse carriers of elongated shape each having two halves pivotally interconnected at their inner ends at the center of the carrier, each of said halves having at its outer end a shaft and a roller rotatably mounted on the shaft, and which further comprises upper and lower sets of parallel rails adapted to support the rollers, two endless draw chains disposed parallel to the edges of the belt, a respective clamping member secured to each carrier half near the shaft on said half and clamping both the belt and the draw chain to the carrier half so as to prevent the chain and belt from being detached from the carrier while the conveyor is in operation, rotatably mounted reversal wheels each engaging the belt, the carriers and the draw chain, means for driving at least one of the reversal wheels in rotation, co-acting stop means on the carrier halves permitting the carriers to sag to a limited extent only, in the upper run of the belt, by relative pivotal movement between their halves, and compelling them to remain straight in the lower run of the belt, and means for straightening each carrier shortly before it passes on to the reversal wheel at the end of the upper run of the belt.

2. A conveyor as claimed in claim 1, in which the clamping members are adapted to be released by hand to permit the conveyor to be lengthened or shortened.

3. A conveyor as claimed in claim 2, in which each clamping member is in the form of a two-armed lever of which one end clamps the conveyor belt to the carrier and the other end clamps the draw chain to the carrier.

4. A conveyor as claimed in claim 2, in which each clamping member is secured to the carrier half by a screw.

5. A conveyor as claimed in claim 3, in which the end clamping the draw chain to the carrier has a convex shape and engages in a horizontally disposed link of the chain so as to press this link into a recess in the carrier.

6. A conveyor as claimed in claim 3, in which the end clamping the belt to the carrier has a convex shape and engages the adjacent part of the belt so as to press said part into a channel provided in the carrier.

7. A conveyor as claimed in claim 1, in which the means for straightening the carriers comprise an endless band arranged centrally of the conveyor belt between the upper and lower run and passing over the adjacent reversal wheel and over a rotatably mounted smaller wheel, said band coming into contact with the bottoms of the carriers shortly before they reach the end of the upper run of the belt and lifting the centres of the carriers to the same height as the rollers.

8. A conveyor as claimed in claim 1, in which each roller shaft makes with its carrier half an angle equal to half the downward inclination of said half when in the sagging position, whereby the angle of inclination of the roller shafts to the horizontal is the same in the upper run of the belt as in the lower run.

9. A conveyor as claimed in claim 1, in which the belt comprises a plurality of belt sections and each two succeeding belt sections overlap one another at their ends, the overlapping portions of the two sections being both connected to the same carrier by means of the clamping members.

10. A conveyor as claimed in claim 1, in which a pair of succeeding belt sections overlap to such an extent that their overlapping portions are both connected to the same two succeeding carriers, whereby when it is desired to extend the conveyor the belt sections can be adjusted to overlap to a lesser extent so that the overlap extends only over one carrier.

References Cited in the file of this patent

UNITED STATES PATENTS 2,763,361     Foster                 Sept. 18, 1956

FOREIGN PATENTS 502,639     Germany              Oct. 10, 1930
737,338     Great Britain          Sept. 21, 1955